United States Patent [19]

Carew

[11] Patent Number: 5,325,605
[45] Date of Patent: Jul. 5, 1994

[54] METHOD AND APPARATUS FOR WASTE TREATMENT

[76] Inventor: E. Bayne Carew, 23131 Lodge La., Dearborn, Mich. 48124

[21] Appl. No.: 960,991

[22] Filed: Oct. 14, 1992

[51] Int. Cl.$^5$ ............................................. F26B 13/10
[52] U.S. Cl. ...................................... 34/526; 34/595; 34/565; 34/573; 110/226; 110/236; 110/186; 588/260
[58] Field of Search ...................... 34/73, 79, 130, 131, 34/132, 133 R, 135, 36, 44, 54, 45, 56; 110/226, 236, 246, 346, 220, 186, 185; 588/209, 213, 260; 432/13

[56] References Cited

U.S. PATENT DOCUMENTS

| | | | |
|---|---|---|---|
| 4,009,667 | 3/1977 | Tyler et al. | 110/186 |
| 4,180,004 | 12/1979 | Johnson | 44/605 |
| 4,405,332 | 1/1965 | Rodriguez et al. | 44/605 |
| 4,560,391 | 12/1985 | Ashworth | 44/605 |
| 4,632,731 | 12/1986 | Bodle et al. | 44/605 |
| 4,648,332 | 3/1987 | Goedhart | 110/236 |
| 4,648,333 | 3/1987 | Mudd et al. | 110/236 |
| 4,667,609 | 5/1987 | Hardison et al. | 110/236 |
| 4,864,942 | 9/1989 | Fochtman et al. | 110/236 |
| 4,872,954 | 10/1989 | Hogan | 202/105 |
| 4,872,998 | 10/1989 | Dausman et al. | 210/710 |
| 4,881,475 | 11/1989 | De Leur | 110/236 |
| 4,913,771 | 4/1990 | McIntyre | 159/47.1 |
| 4,941,952 | 7/1990 | Betz | 201/1 |
| 4,961,391 | 10/1990 | Mak et al. | 110/246 |
| 4,974,528 | 12/1990 | Barcell | 110/226 |
| 4,984,594 | 1/1991 | Vinegar et al. | 134/21 |
| 4,992,174 | 2/1991 | Caplan et al. | 210/610 |
| 5,003,143 | 3/1991 | Marks et al. | 219/10.55 M |
| 5,049,499 | 9/1991 | Atlas et al. | 435/170 |
| 5,059,252 | 10/1991 | Renfro, Jr. | 134/7 |
| 5,072,674 | 12/1991 | Noland | 110/346 |
| 5,078,868 | 1/1992 | Robertson | 110/236 |
| 5,101,740 | 4/1992 | Abril | 110/346 |
| 5,103,578 | 4/1992 | Rickard | 110/236 |
| 5,117,771 | 6/1992 | Summers | 110/236 |

OTHER PUBLICATIONS

Astrom, Karl Johan, "Toward Intelligent Control", 1988 American Control Conference, pp. 60–64.
Coelho, A. A. R. et al., "Comparison of Self–Tuning", Dec. 1989, pp. 1058–1059.
Jakob, Francois, "Situation Assessment for Process Control", Apr., 1990, pp. 49–59.
Jantrania, A. R., et al., "An Expert System for Design Analysis of Municipal Sludge Land", 1989, pp. 666–669.
Raisch, J., "Loop Shaping Controller Design for a Binary Distillation Column", pp. 1271–1276.
Scattolini, R., "Self–Tuning Multirate Control of Binary Distillation Columns", pp. 35–40.
Tabrizi, M. H. Nassehzadeh, "Modeling for Controller Design in Tray Distillation".
Tabrizi, M. H. Nassehzadeh, "An Investigation Into the Dynamics of the Distillation".
Tabrizi, M. H. Nassehzadeh, "An Analytical Study of the Dynamics of Long Tray Type".
Tham, M. T., Ph.D., "Multivariable and Multirate Self–Tuning Control", Jan. 1991, pp. 9–24.
Walburn, D. H., "Automated Acquisition of Knowledge for an Expert System".
Wassick, John M., "Multivariable Internal Model Control for a Full–Scale" Jan., 1989.
Webster, David M., "Enclosed Thermal Soil Aeration for Removal of Volatile" Copyright 1986.

Primary Examiner—Denise Gromada
Attorney, Agent, or Firm—Howard & Howard

[57] ABSTRACT

A computer based material processing system 10 allows for the processing of contaminated material in a manner which allows the material to be discharged into a sewage facility or placed in a landfill.

4 Claims, 5 Drawing Sheets

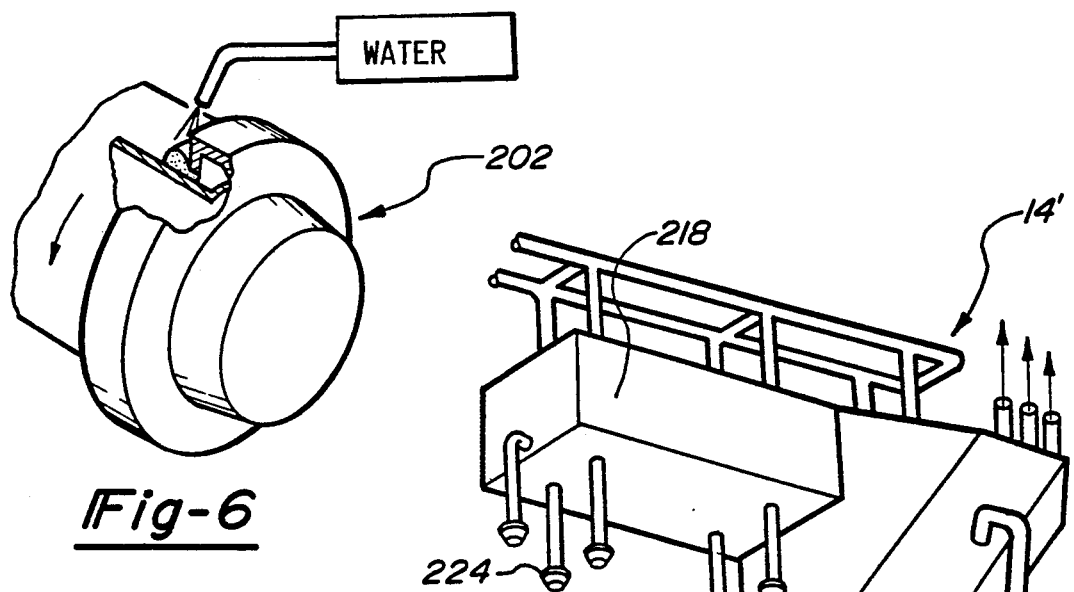
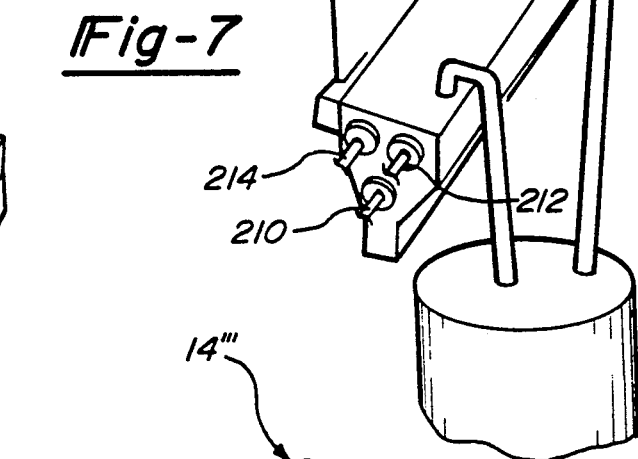
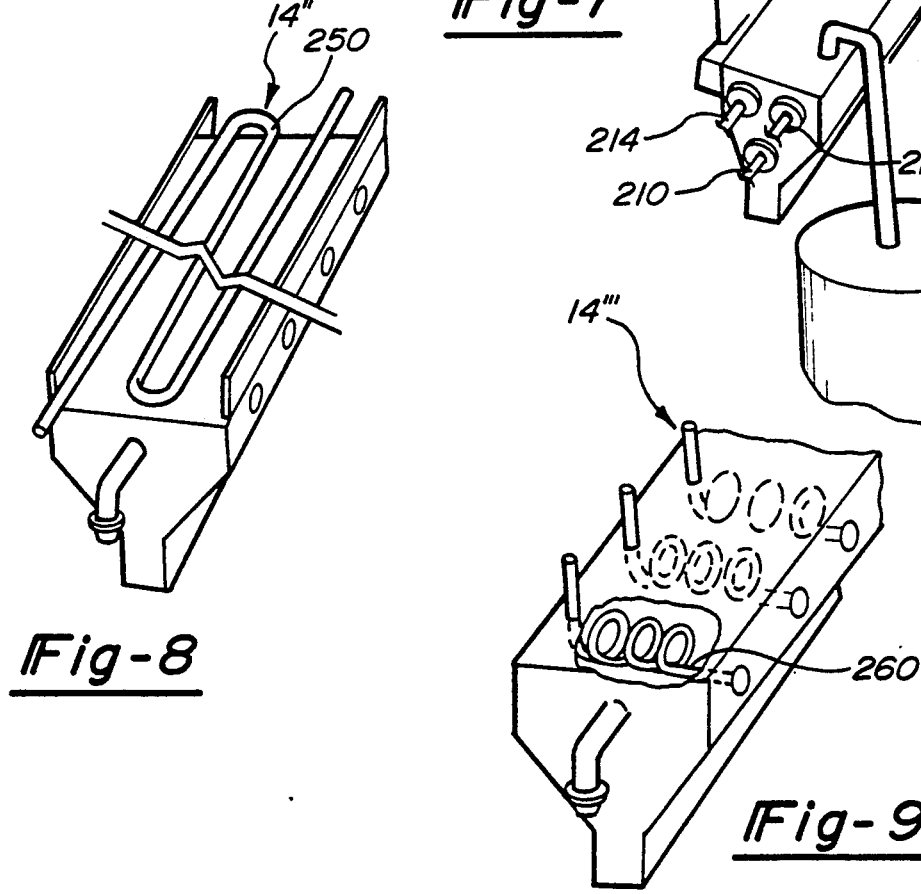

METHOD AND APPARATUS FOR WASTE TREATMENT

BACKGROUND OF THE INVENTION

1. Field of the Invention

This invention relates to a method and apparatus for waste treatment, and more particularly to a computer-based system which is adapted to process liquid and solid waste and is effective to allow the processed waste to be selectively inputed to a municipal wastewater collection system or to a landfill.

2. Discussion

Waste products, such as oil laden soil and paint, are normally buried within a landfill which is usually regulated under discharge limits found in the United States Federal Industrial Pre-treatment Program, and which is managed by a state and/or local governmental entity. To protect local water suppliers against contamination and to ensure compliance with Federal requirements, these local and state governmental entities closely regulate the type and amount of the waste which may be buried within the landfill.

Liquid waste is normally not allowed to be placed within a typical landfill since such waste usually leaches out from the landfill, contaminating local water tables and the surrounding soil. In fact, even substantially solid waste material has a tendency to leach its liquid constituents into the surrounding environment. For this reason, layers of "sandy-type" material are normally required to be placed over certain volumes of the buried solid waste, in order to substantially prevent such solid waste leaching. Notwithstanding leaching difficulties, many types of solid waste materials are not allowed to be buried within a landfill due to their extremely elevated levels of toxicity. These "non-landfill" materials are usually incinerated or otherwise disposed of. Such incineration is both costly and environmentally hazardous, since toxic gaseous by-products are often released into the atmosphere as a consequence of such incineration.

There is therefore a need to provide a waste treatment processing system which is adapted to process solid and liquid waste material in a manner sufficient to allow the processed wastes to be placed within a landfill, purified for later distribution within the surrounding environment, and/or recycled, and is adapted to produce none of the harmful by-products associated with the prior treatment systems.

SUMMARY OF THE INVENTION

It is therefore a primary object of this invention to provide a waste treatment processing system which is adapted to receiving various types of solid waste, and which is further adapted to process the received waste in a manner which meets certain regulatory standards, thereby allowing the processed waste to be placed within a landfill.

It is another object of this invention to provide a waste treatment processing system which is adapted to receive liquid waste, and which is effective to process the received liquid waste in a manner which allows the processed waste to be discharged into a typical sanitary sewage system and/or into a fresh water stream if allowed by environmental government authorities.

It is yet a further object of this invention to provide a controlled atmosphere incineration system which is adapted to receive substantially solid waste and which is further adapted to separate the solid waste from its constituent carbon-based, and, with specific high temperature provisions, metal contaminants and certain other useful materials from mining products, and reduce carbon based materials to elemental carbon or charcoal-like products.

It is another object of this invention to provide a waste processing system which is adapted to receive waste material, to separate carbon-based contaminants from the waste material, and to generate no gaseous or other by-products to the environment during such processing.

It is another object of this invention to provide a waste processing system which is adapted to be monitored and controlled by a computer network system, and which is further adapted to process solid and liquid waste material in a manner which is effective to allow the material to be placed within a landfill or released into the environment.

According to the teachings of the first embodiment of this invention, a processing method and apparatus is provided which receives waste material, which heats the waste material in a manner which is adapted to prevent by-products from being released into the environment, and which allows the processed material to be placed within a landfill.

Further objects, features, and advantages of the invention will become apparent to one of ordinary skill in the art from a consideration of the following description and the appended claims, when taken in conjunction with the accompanying drawings.

BRIEF DESCRIPTION OF THE DRAWINGS

Various advantages of the present invention will become apparent to those of ordinary skill in the art by reading the following specification and by reference to the following drawings in which: .

FIG. 6 is a sectional view taken along view line 6—6 of FIG. 5;

FIG. 7 is a partial perspective view of the bulk distillation and fractionation system shown in FIG. 1 and made in accordance with the teachings of a second embodiment of this invention;

FIG. 8 is a partial perspective and sectional view of a bulk distillation and fractionation system made in accordance with the teachings of a third embodiment of this invention;

FIG. 9 is a partial perspective and sectional view of a bulk distillation and fractionation system made in accordance with the teachings of a fourth embodiment of this invention.

DETAILED DESCRIPTION OF THE INVENTION

Figure 1:
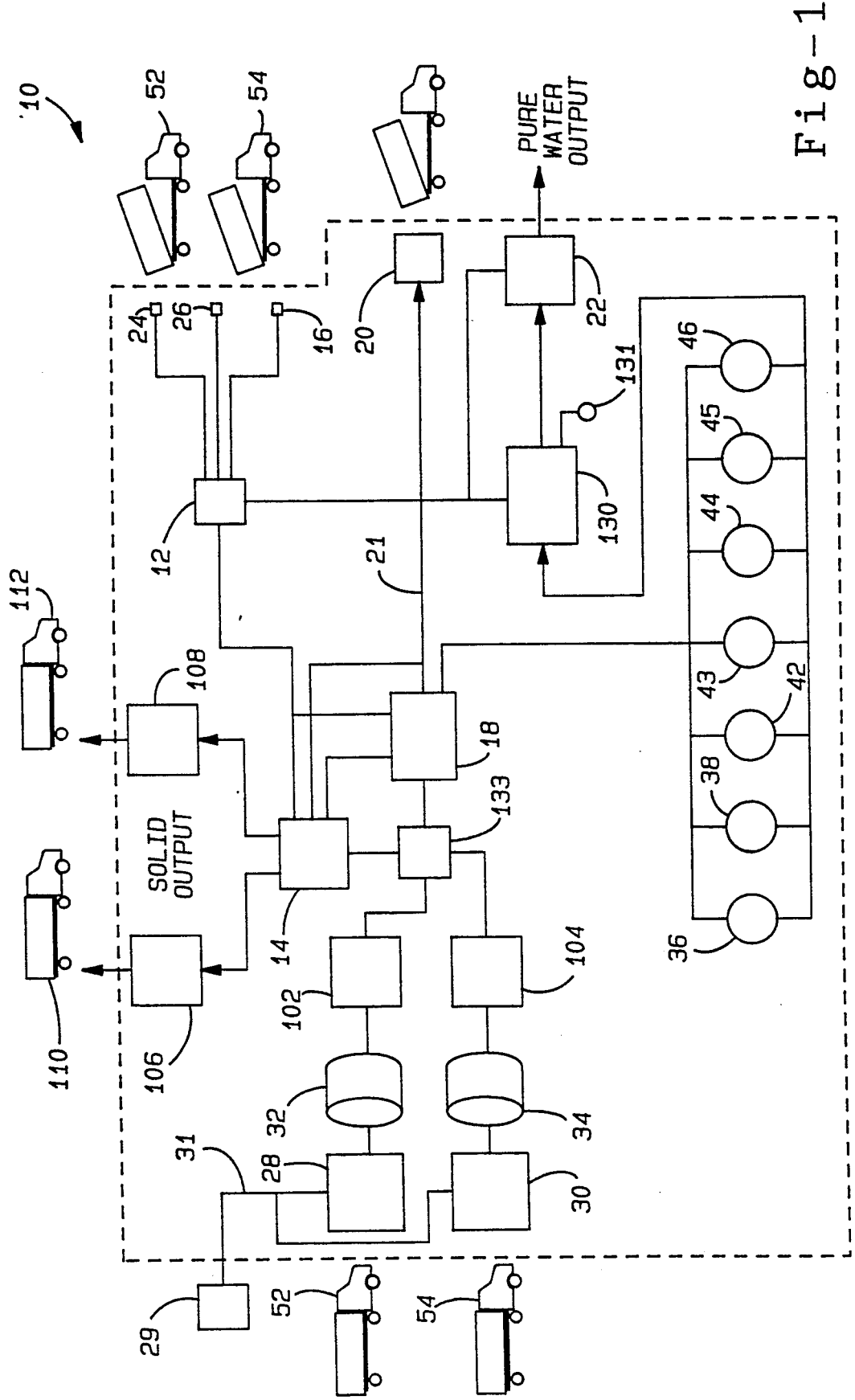
FIG. 1 is a block diagram of the waste processing system made in accordance with the teachings of a preferred embodiment of this invention.

Referring now to FIG. 1, there is shown a computer based waste processing treatment system 10 made in accordance with the teachings of a preferred embodiment of this invention. As shown, processing system 10 includes a computer processing portion 12 which is coupled to a bulk distillation and fractionation drying system 14; material analysis system 16; filter press assembly 18; chute 20; bag and affinity filter assembly 22; and rapid liquids analyzers 24, 26. As shown, system 10 also includes grating separators and hoppers 28 and 30 which are respectively coupled to centrifugal separators 32 and 34, and materials treatment solution containers 36, 38, 40, 42, and 44. Alternatively, assemblies 28, 30, 32, and 34 may be replaced by a commercially available vibrating grating separator manufactured by Sweco which may contain provision for steam cleaning and heavy object removal.

Figure 2:
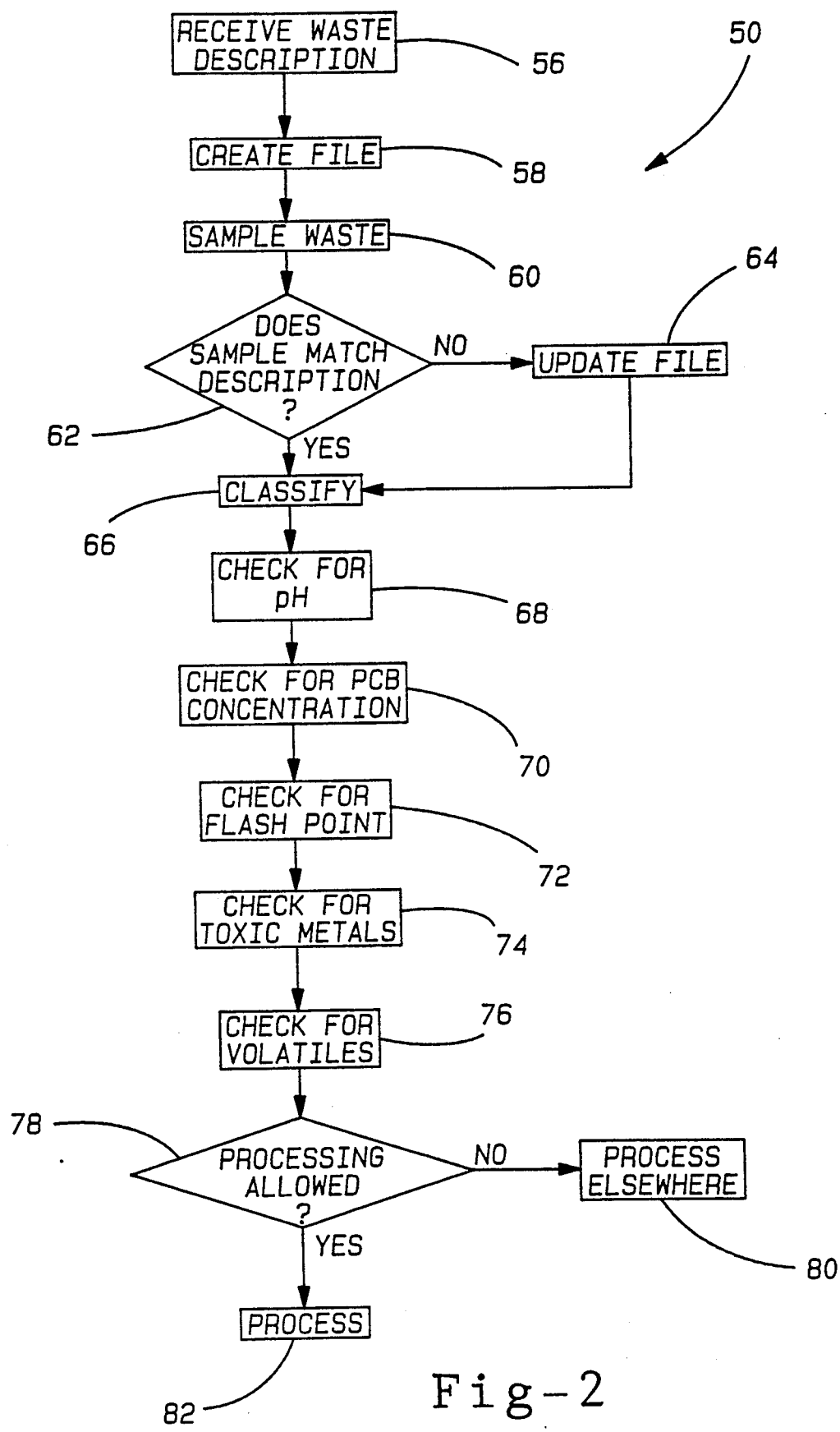
FIG. 2 is a flow chart illustrating a sequence of steps associated with the operation of the system shown in FIG. 1.

To understand the operation of system 10, reference is now made to flow chart 50 of FIG. 2. As shown, waste is initially received on normal and respective flat-bed and liquid vacuum trucks 52 and 54, shown in FIG. 1. Normally, the constituent waste products included within each of the reception trucks is set forth within a waste description document. This document is governmentally required to be generated by the waste producer and to be in the possession of the waste transporter. This document is received by an operator of computer 12, in step 56.

Step 56 is then followed by step 58 in which an operator of computer 12 creates a unique computer file structure associated with shipment of received waste material. The computer file, in the preferred embodiment of this invention, includes the identity and location of the waste producer and transporter and the waste description found within the document received in step 56.

Step 58 is followed by step 60 in which the received waste is preliminarily analyzed by use of typical material analyzers 24 or 26 (such as spectrometers) in order to determine if the description, included within the document received in step 56, is correct and to determine the amount of liquid contained within the received material. It should be realized by one of ordinary skill in the art, that analyzers 24 and 26 may be replaced by other commercially available electronic chemical analysis equipment, adapted to selectively analyze waste material.

Step 62 follows step 60 and, in this step, computer 12 is adapted to compare the sampled signal outputs of devices 24 and 26 with the waste description included within the previously created computer file. If this information is not substantially identical, step 62 is followed by step 64. Alternatively, step 62 is followed by step 66. In step 64, an operator of computer 12 updates the created file in accordance with the sampled data input. Step 64 is then followed by step 66.

In step 66, computer system 12, based upon the file data, classifies the received waste into one of several categories which are based upon seven corresponding treatment protocols. These categories, in the preferred embodiment of this invention, include (1) oil and grease materials, food wastes, and municipal sludge; (2) grinding swarf and catch basin sludge; (3) waste and soluble oils; (4) phenols and benzene compounds; (5) MIBK materials; (6) leachate; and (7) soils and other substantially solid waste products. The chosen classification is appended to the previously created computer. After such classification is completed, vehicles 52 and 54 are moved in close proximity to analyzer 16, shown in FIG. 1, and whose operation will now be discussed with reference to the remaining steps within flow chart 50.

Specifically, analyzer 16 is adapted, in step 68, to ascertain the acidity of pH level of the waste material. Step 68 is followed by step 70 in which analyzer 16 is adapted to determined the level of PCB and like material concentration within the received waste material. Step 72 follows step 70 and, in this step, analyzer 16 is adapted to determine the flash point associated with the received material. In step 74, analyzer 16 is adapted to determine the existence and level of toxic constituent metals, while in step 76 analyzer 16 is adapted to determine the existence and level of volatile constituent materials. In the preferred embodiment of this invention, the electronic output signals associated with the steps 68, 70, 72, 74 and 76 are communicated to computer 12. In step 78, computer 12 compares the levels and determinations associated with step 68-76 against certain and predetermined values previously stored within computer 12, and determines whether further processing is allowed. If such processing is not allowed, step 78 is followed by step 80 in which the material is directed to other processing facilities. Alternatively, step 78 is followed by step 82 in which waste treatment processing of the received waste material is accomplished in accordance with the teachings of the preferred embodiment of this invention.

Figure 3:
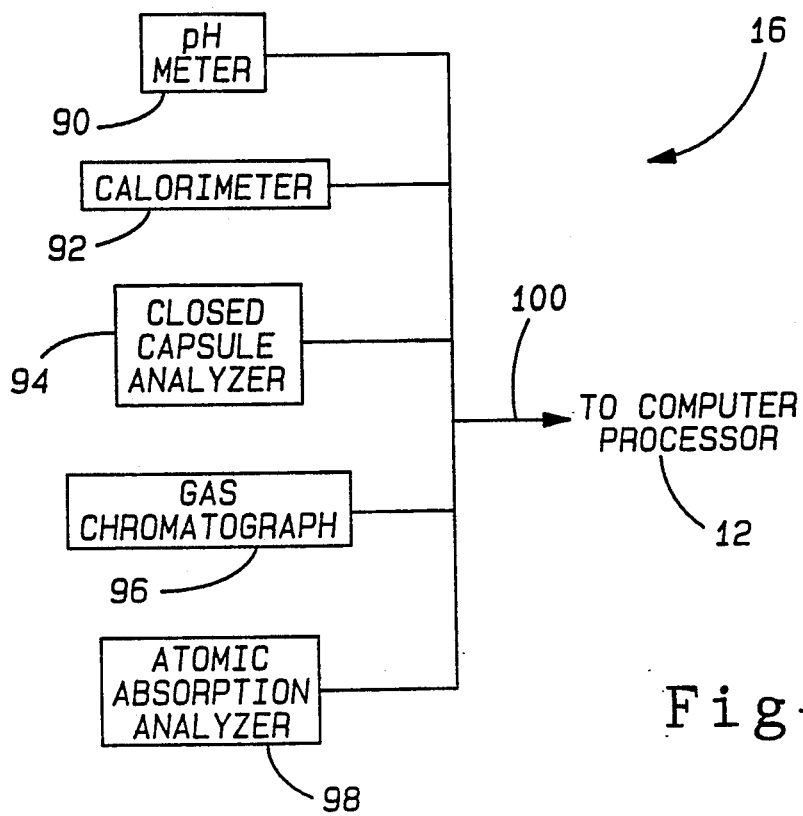
FIG. 3 is a block diagram of the pre-processing portion of the system shown in FIG. 1.

In order to understand the operation of analyzer 16, reference is now made to FIG. 3 in which a block diagram of this analyzer is shown. Specifically, analyzer 16 includes a commercially available acidity or pH meter 90 adapted for use in step 68; a commercially available calorimeter 92 adapted for use in step 70; a commercially available closed capsule analyzer 94 adapted for use in step 72; a commercially available gas chromatograph 96 adapted for use in step 74; and a commercially available atomic absorption analyzer 98 adapted for use in step 76. As shown in FIG. 3, and as previously explained, devices 90, 92, 94, 96 and 98 are coupled by bus 100 to computer processor 12 in order for computer processor 12 to perform step 70 as previously discussed.

Once computer processor 12 determines that processing is allowed, the received material is input onto a drum processing pad 29 or into a commercially available grating, separating, and hopper assembly 28 or 30 or, alternatively, a heavy duty vibrating grating separator with self cleaning properties. The contents of the drums from pad 29 are carried by conveyor 31 to hopper assembly 28 and 30 to be processed along with materials from roll-off vac-trucks. In the preferred embodiment of this invention, assembly 28 is uniquely associated with solid waste, while assembly 30 is associated with liquid waste. Moreover, assemblies 28 and 30 are adapted to separate foreign objects, such as metal, from the waste material in order to protect the various apparatuses used within system 10 for waste processing. The output of each assembly 28 and 30 is input to respective and commercially available centrifugal separators 32 and 34 which are adapted to separate the received material by weight. That is, the heaviest constituent material is output first while the lightest material is output last from the separators 32, 34. In the preferred embodiment of the invention, separators 32 and 33 each comprise commercially available separators manufactured by the Sweco Company. The output material is placed through vibrating screens 102 and 104 which are adapted to further remove any remains extraneous foreign objects from the waste material, before further processing is achieved. In the preferred embodiment of the invention, screens 102 and 104 each comprise a model LM USG0C888 screen manufactured by the Sweco Company. The solid output from vibrating screen 102 is input to the bulk distillation and fractionation dryer 14, where the material is normally heated to a temperature of about 200° Fahrenheit to a maximum of 1200° Fahrenheit in an indirect and controlled manner, thereby causing the various contaminant constituents to be selectively separated from the material, and to "distill out" once in contact with a condenser or, at temperatures near the 1200° Fahrenheit maximum, certain carbon based materials may undergo thermal decomposition to elemental carbon (carbonized). Alternatively, the dryer may be fitted with a ceramic, alumina, or zirconium oxide/alumina/silica lining to surbin temperatures of approximately 3000° Fahrenheit to further process carbon based materials and some metal contaminants. The structure and operation of dryer 14 will be explained later in this application. The output and treated material emanating from dryer 14 is transported by conveyors 106 and 108 to transport vehicles 110 and 112 for placement within a typical landfill. In fact, the solid output material emanating from dryer 14 is normally sandy in nature; and has the advantage of being used as sand fill material for a typical solid waste landfill. If the by-product of the dryer is elemental carbon or charcoal, such materials are also useful as soil conditioners or, in bracketed form, alternate energy sources.

Liquid wastes emanating from vibrating screen 104 enter into one of the cascaded treatment solution tanks 36, 38, 40, 42, and 44, each tank being uniquely identified with one of the seven categories associated with step 66. The treated liquid waste then enters a commercially available lamellar filter flocculant assembly 130 where it is treated with a flocculating agent residing within tank 131 and output to filter assembly 22 manufactured by Rosedale. In the preferred embodiment of this invention filter 130 comprises a commercially available series 55 unit, manufactured by the Parkson Corporation. In this manner, filters 130 and 22 in combination with the materials included within containers 36–44 cooperate to produce substantially pure water which may be outputted to a typical sewage system or freely disposed of within the environment. In some cases, solids emanating from vibrating screen 102 may be initially input to filter press 18 in order to have their constituent liquid input to filter flocculant 130 and filter assembly 22 in the previously described manner. The solid remaining after filtering, is then input to dryer assembly 14, from filter press 18, for processing in accordance with the previous description. As stated above, the process occur by commands generated by computer 12 and received at commercially available diverter valve assembly 133. Moreover, such computer commands are generated only if the analysis performed by analyzers 24, 26 indicates the presence of approximately 20% by weight (or higher) of liquid material. In the preferred embodiment of the invention, press 18 comprises a commercially available press manufactured by the CPC Engineering Corporation and referred to as Model No. 848404.

Figures 4, 5:
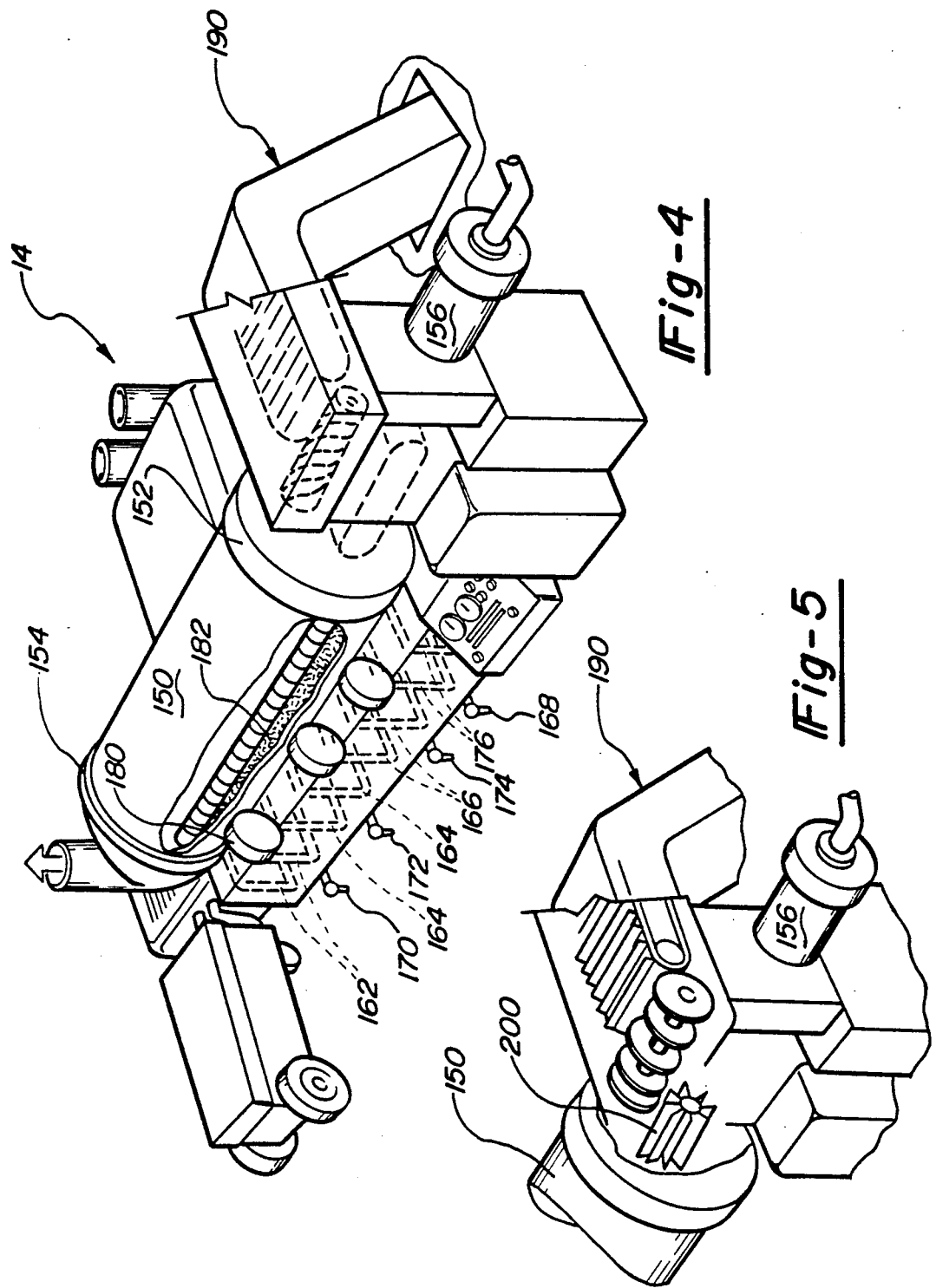
FIG. 4 is a partial perspective view of the bulk distillation and fractionation system shown in FIG. 1.
FIG. 5 is a partial prospective and sectional view of FIG. 4, taken along the view line 5—5.

To understand the use of the operation of the bulk distillation and fractionation system, reference is now made to FIGS. 4, 5 and 6 illustrating a first embodiment of dryer 14, which substantially corresponds to a commercially available dryer manufactured by Contamination Technologies Company and referred to as model LTTA-401HT. Specifically, in the first embodiment of this invention, dryer 14 includes a substantially cylindrical drum 150 which is rotatably coupled to a substantially circular header 152 and footer 154. Included within rotating drum 150, is a substantially cylindrical burner 156 which is adapted to selectively provide a certain amount of heat within the interior drum 150.

Dryer 14 further includes several condensers 162, 164, 166 and 168 which are placed below burner assembly 156, and which are connected to distillation output ports 170, 172, 174 and 176, and which communicate with the interior of drum 150. Moreover, dryer 14 further includes ports 180 which are adapted to receive nitrogen gas from the nitrogen source and to allow the received gas to be injected into the burner 156 and heated in an outer sleeve 157 without directly contacting the burner 156 and to enter the interior of drum 150 through openings in the sleeve, thereby indirectly heating the contaminated material 182 included within rotating dryer 150. Once initially received, the injected nitrogen gas, in the preferred embodiment of this invention, traverses rotating drum 150 from header 152 to footer 154 and then is recirculated below condensers 162–168 until returning to header 152 obviating the need for supplemental gas injections and/or by-product nitrogen gas output. In this manner, the nitrogen gas cooperates with burner 156 to indirectly heat the contaminated material 182 as it traverses through drum 150 upon conveyor 190, while substantially preventing any of the contaminant from being exhausted to the atmosphere and surrounding areas.

In the preferred embodiment of this invention, the temperatures within dryer 150 are sufficiently higher to force oil and other carbon-based contaminants to become gaseous and to thereafter contact condensers 162–168, thereby distilling out of one of the output ports 170–176 according to the unique molecular weight and condensing properties of the gaseous constituent contaminant material. The distilled waste is then removed to landfills or similar waste treatment sites or recycled. While such distribution operations are normally conducted at between 200° Fahrenheit and 600° Fahrenheit, temperature between 1000° Fahrenheit and 1200° Fahrenheit may be employed to carbonize certain carbon based solid wastes such as wood or cotton or plastic, among others where the by-product may be harmless charcoal. Under more demanding conditions the rotating drum 150 may be filled with a liner 151 which is ceramic or a mixture of ceramic/zirconium oxide/silica to reach temperatures up to 3000° Fahrenheit to carboniz toxic chemical and distill same metallic waste or even recovered materials as elemental sulfur and shale oil from mining products. Contaminated soils, mining products and the such are led to the BDF unit 14 through chute 20 and conveyor 21. The "cleaned" or treated soil or other by-products are output to chutes 106 or 108. It should be apparent to one of ordinary skill in the art, that contaminated material 182 may be placed within drum 150 by a number of methods including a typical screw feeder or conveyor system 190.

Referring now to FIG. 5, it is seen that a scraper and vapor lock assembly 200 may be provided, which is effective to allow the material to be conveyed within rotating drum 150 while concurrently insuring that the contained material does not exit from the header portion 152 of drum 150. To further insure such sealing, a typical rotating drum or rotary joint 202, as shown in FIG. 6, may also be provided.

In a second dryer embodiment of this invention, dryer 14' shown in FIGS. 7, 8 and 9 may be adapted to have a plurality of burners 210, 212 and 214 axially enclosed within a fixed drum assembly of a substantially triangular cross section. In this second embodiment, condenser assembly 218, coupled to a water supply source 220 may be coupled to one side of burner 14' and have distillation ports 224 project downwards from the condenser. The advantage of the embodiment shown in FIG. 7 over that shown in FIG. 1 is that the stationary nature of burner 14' allows for a longer operational life and a simpler system.

In yet a third embodiment of the dryer, dryer 14", shown in FIG. 8, has a condenser 250 which is adapted to traverse the top of burner 14" thereby volatilizing the gaseous contaminant as they rise within the burner.

Moreover, in yet a third embodiment of the burner shown in FIG. 9, dryer 14''' has a substantially identical and unique burner assemblies 260 placed below the condenser 250, thereby being adapted to vaporize gaseous contaminant material as it is contained within the chamber 14'''. It should therefore be apparent to one of ordinary skill in the art from the following discussion, that system 10 is adapted to process both liquid and solid waste in a manner which allows the waste to be output as substantially pure liquid and/or a sandy material or other such solid which may be suitable for a landfill. Moreover, it should also be apparent to one of ordinary skill in the art that the system is made to reside under computer control and, accordingly, may be easily modifiable upon a software modification to a wide area network implemented on a Novell network system or the such using a Microsoft Windows platform.

Figure 10:
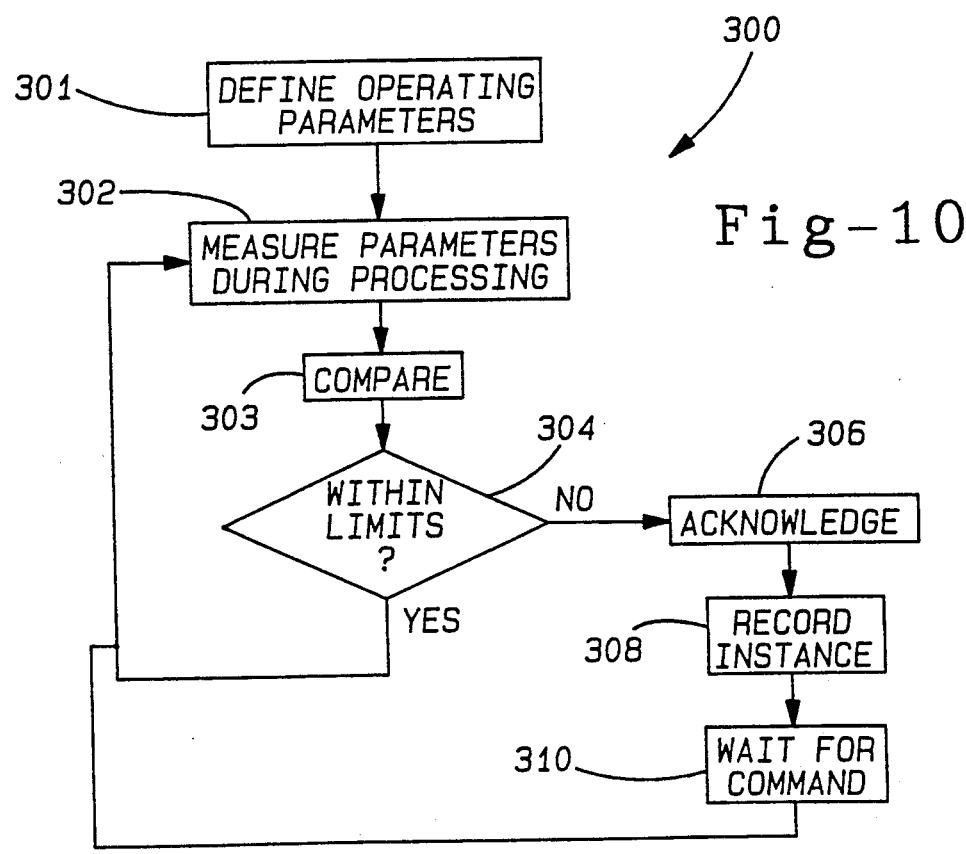
FIG. 10 is a block diagram illustrating the sequence of operational steps associated with the computer shown in FIG. 1.

To fully understand the computer based nature of system 10, reference is now made to flow chart 300 of FIG. 10. As shown, the operating parameters of any of the devices included within system 10 may be stored within computer 12, in step 301. Examples of such operational parameters include dryer temperature, constituent contaminate material included within the output chutes 106 and 108, and/or the amount of material being input through system 10. These parameters may then be measured by computer 12, in step 302 and compared with the defined parameters in step 303. If these parameters are within a predetermined tolerance or limits, as shown in step 304, continued measurement by system 12 is performed. Alternatively, step 304 is followed by step 306 in which computer 12 acknowledges an "out of tolerance condition". Step 308 follows step 306 and, in this step, computer 12 is adapted to record the instance of such failure. In step 310, computer 12 is then adapted to wait for "reset" command before entering step 302. In this manner, computer 12 may continually monitor the operation of system 10 while insuring that system 10 performs within predefined and certain tolerance limits. Moreover, in yet a further embodiment of this invention, steps 306, 308 and 310 may be replaced by a sequence of steps in which computer 12 continually and actively updates its tolerance record in accordance with new and "usual" operational values. In this manner, computer system 12, as should be known to those ordinary skilled in the art, could act as an "expert or artificial intelligence" system.

It is to be understood that the invention is not limited to the exact construction or method illustrated and described above, but that various changes and modifications may be made without departing from the spirit and the scope of the invention as defined in the following claims.

In the claims:

1. A material treatment system comprising:
    an input means for receiving a material to be cleaned;
    a computer means coupled to said input means, said computer means storing a reported description of a material to be cleaned, means for obtaining a sample of the material to be cleaned, and an analyzer for determining the actual consistency of the waste from the sample, said analyzer communicating with said computer to compare the actual consistency of the material to be cleaned with that reported by the waste description, and update the memory of the waste description should the two differ, means for determining whether the material can be processed by the system based on the actual consistency of the material;
    means for selectively heating and cooling the material; and
    conveyer means for moving said material outwardly after having been cleaned.

2. A material treatment system as recited in claim 1 wherein said computer and said analyzer are also capable of checking for a pH content, for PCB concentration, checking for the flash point of the material, checking the material for toxic metals, and checking for volatile components, and said computer means being adapted to make said determination of whether processing of the material is allowable based upon these detected parameters, and only allowing processing of the material after this determination is made.

3. A method of treating a material comprising the steps of:
    providing a computer;
    providing a material to be cleaned to the system, a waste description being associated with the material;
    storing that waste description in the computer;
    analyzing a sample of the actual material, and comparing the analyzed sample with the description stored in the computer;
    updating the computer record if the actual analyzed sample differs from that in the description;
    the computer making a determination of whether the particular material can be processed;
    heating the material if the computer determines the material can be processed; and
    causing a cleaned material to be outputted of the system.

4. A method as recited in claim 3, wherein the computer makes the further steps of:
    checking the material for pH content;
    checking the material for PCB concentration;
    checking the material for its flash point;
    checking the material for the presence of toxic metals;
    checking the material for the presence of volatile compounds; and
    said computer then making said determination of whether processing of the particular material can be made based upon the content of the material; and
    processing the material to clean the material only proceeding after the computer has made this initial determination.

* * * * *